(12) United States Patent
Edmonson

(10) Patent No.: US 10,773,631 B1
(45) Date of Patent: *Sep. 15, 2020

(54) FORWARD FACING VEHICLE TRANSPORT AND RETURN TRANSPORT VEHICLE COMBINATION

(71) Applicant: Ironman FFB, LLC, Edmond, OK (US)

(72) Inventor: Tommy Edmonson, Choctaw, OK (US)

(73) Assignee: Ironman FFB, LLC, Edmond, OK (US)

(*) Notice: Subject to any disclaimer, the term of this patent is extended or adjusted under 35 U.S.C. 154(b) by 0 days.

This patent is subject to a terminal disclaimer.

(21) Appl. No.: 16/235,723

(22) Filed: Dec. 28, 2018

Related U.S. Application Data

(63) Continuation-in-part of application No. 16/235,020, filed on Dec. 28, 2018.

(51) Int. Cl.
| | | |
|---|---|---|
| *B60P 3/077* | (2006.01) | |
| *B60P 3/12* | (2006.01) | |
| *B62D 53/06* | (2006.01) | |

(52) U.S. Cl.
CPC .............. *B60P 3/077* (2013.01); *B60P 3/125* (2013.01); *B62D 53/062* (2013.01)

(58) Field of Classification Search
CPC ..... B62D 63/065; B62D 53/062; B60P 3/077; B60P 3/125
See application file for complete search history.

(56) References Cited

U.S. PATENT DOCUMENTS

| | | | |
|---|---|---|---|
| 3,837,673 A | | 9/1974 | McCarthy |
| 3,881,749 A | * | 5/1975 | Berends ............... B62D 53/065 280/417.1 |
| 3,987,919 A | | 10/1976 | Weeks et al. |
| 4,132,326 A | | 1/1979 | Pinto |
| 4,317,579 A | | 3/1982 | Louw |
| 4,348,054 A | | 9/1982 | Shonkwiler et al. |
| 4,372,572 A | * | 2/1983 | Verschage ............ B62D 53/065 280/441.2 |
| 4,493,491 A | | 1/1985 | Karlik |
| 4,569,531 A | | 2/1986 | Beadle |
| 4,632,629 A | * | 12/1986 | Kooima .................. B60P 3/125 280/402 |

(Continued)

*Primary Examiner* — Anne Marie M Boehler
*Assistant Examiner* — Michael R Stabley
(74) *Attorney, Agent, or Firm* — Hall Estill Attorneys at Law; Tyler Mantooth

(57) ABSTRACT

A forward facing vehicle transport ("FFVT") and return transport vehicle ("RTV") combination is provided. The FFVT of the combination includes at least a main support member supported by an axle, and the axle in turn is supported by a wheel. The FFVT further provides a toe tongue that is secured to the main support member and extends in a first direction from the main support, and a pull tongue secured to the main support member and extending in a second direction from then main support. The RTV of the combination provides a return transport vehicle axle supporting a retracting bed, which includes a front section in sliding interaction with a rear section. The RTV further provides a return transport vehicle guide post secured to the axle, and a return transport vehicle vertical slide member attached to the rear section of the return transport vehicle.

21 Claims, 12 Drawing Sheets

(56) References Cited

U.S. PATENT DOCUMENTS

| | | | |
|---|---|---|---|
| 4,650,205 A | 3/1987 | Jarlsson | |
| 4,737,066 A * | 4/1988 | Allison, Jr. | B60P 3/125 280/402 |
| 4,778,333 A * | 10/1988 | Youmans | B60P 3/125 280/402 |
| 4,842,472 A * | 6/1989 | Plant | B60P 3/125 280/402 |
| 4,943,202 A | 7/1990 | Galloway | |
| 5,013,056 A | 5/1991 | Landoll et al. | |
| 5,016,897 A * | 5/1991 | Kauffman | B60P 3/073 280/402 |
| 5,249,911 A * | 10/1993 | Marola | B62D 53/0828 280/402 |
| 5,326,215 A * | 7/1994 | Eberhardt | B60P 3/07 410/29.1 |
| 5,566,964 A * | 10/1996 | Leonard | B60D 1/07 280/416.1 |
| 5,667,231 A | 9/1997 | Dierks et al. | |
| 5,863,059 A | 1/1999 | Waggoner | |
| 6,036,207 A | 3/2000 | Oehlerking et al. | |
| 6,036,428 A * | 3/2000 | Kooima | B60P 3/125 280/402 |
| 6,287,061 B1 | 9/2001 | Tinnell | |
| 6,461,096 B1 * | 10/2002 | Mentele | B60P 3/122 280/656 |
| 6,786,158 B2 | 9/2004 | Jacob | |
| 6,857,376 B2 | 2/2005 | Coslovi et al. | |
| 6,886,362 B2 | 5/2005 | Wilding et al. | |
| 6,893,205 B2 | 5/2005 | Heim et al. | |
| 6,901,728 B2 | 6/2005 | Keiderman | |
| 6,902,368 B2 | 6/2005 | Hagenzieker | |
| 7,017,934 B2 * | 3/2006 | Harris | B60P 3/127 280/438.1 |
| 7,547,179 B1 | 6/2009 | Edmonson | |
| 7,789,411 B2 * | 9/2010 | Schuettenberg | B60D 1/00 280/400 |
| 8,151,426 B2 * | 4/2012 | Schneider | B60D 1/07 280/417.1 |
| 8,267,419 B2 * | 9/2012 | Schuettenberg | B60D 1/00 280/402 |
| 8,353,521 B1 * | 1/2013 | Seeley | B60D 1/665 280/417.1 |
| 8,622,413 B2 * | 1/2014 | Schuettenberg | B60D 1/145 280/476.1 |
| 9,114,677 B2 * | 8/2015 | Schuettenberg | B60D 1/015 |
| 9,381,958 B2 * | 7/2016 | Schuettenberg | B60D 1/486 |
| 9,637,039 B1 * | 5/2017 | Vildosola | B60P 3/125 |
| 2004/0075242 A1 * | 4/2004 | Richards | B60D 1/155 280/478.1 |
| 2006/0072999 A1 * | 4/2006 | Manley, Sr. | B60P 3/125 414/563 |
| 2007/0020073 A1 | 1/2007 | Chaddock | |
| 2007/0098536 A1 * | 5/2007 | Kooima | B60P 3/125 414/563 |
| 2010/0084837 A1 * | 4/2010 | Quiring | B60D 1/06 280/491.5 |

\* cited by examiner

FORWARD FACING VEHICLE TRANSPORT AND RETURN TRANSPORT VEHICLE COMBINATION

CROSS REFERENCE TO RELATED APPLICATIONS

This application is a continuation-in-part of copending U.S. patent application Ser. No. 16/235,020 filed Dec. 28, 2018 entitled "Forward Facing Vehicle Transport Apparatus."

FIELD OF THE INVENTION

The claimed invention relates to the field of vehicle transport equipment; more particularly, but not by way of limitation, to a combination forward facing vehicle transport and a return transport vehicle. The forward facing vehicle transport is useful in transporting long haul semi tractors from an origin to a destination, and the return transport vehicle, is useful in transporting a return vehicle to the destination, and transporting the forward facing vehicle transport back to the origin.

SUMMARY OF THE INVENTION

In accordance with an exemplary embodiments, a combination forward facing vehicle transport ("FFVT") and return transport vehicle ("RTV") is provided. The exemplary embodiment of the FFVT, of the combination, includes at least a main support member supported by an axle, and the axle in turn is supported by a wheel. The FFVT further provides a toe tongue that is secured to the main support member and extends in a first direction from the main support. The toe tongue provides a telescopic extension member communicating with an extension mechanism, the telescopic extension member is configured to interact with a steer axle of a first vehicle, the steer axle supported by a tire of the first vehicle. The FFVT further includes a pull tongue secured to the main support member and extending in a second direction from then main support. The pull tongue provides a sliding extension member that communicates with an expansion mechanism. The sliding extension member is configured to interact with a fifth wheel of a second vehicle.

In exemplary embodiment of the combination FFVT and RTV. The RTV preferably provides retracting bed, which includes at least a front section and a rear section, in which the front section is in sliding interaction with the rear section. The return transport vehicle further preferably includes at least a return transport vehicle axle supporting the retracting bed, a return transport vehicle guide post secured to the axle, and a return transport vehicle vertical slide member attached to the rear section of the return transport vehicle, the vertical slide member is in sliding contact with the return transport vehicle guide post. Also preferably included is a return transport vehicle vertical position control apparatus interposed between the return transport vehicle vertical slide member and the axle. The return transport vehicle vertical position control apparatus is responsive to a control system, the control system controls a vertical position of the retracting bed.

BRIEF DESCRIPTION OF THE DRAWINGS

FIG. 6A illustrates an alternate embodiment of an axle cradle of FIG. 6.

DETAILED DESCRIPTION

Reference will now be made in detail to one or more examples of the invention depicted in the figures. Each example is provided by way of explanation of the invention, and not meant as a limitation of the invention. For example, features illustrated or described as part of one embodiment may be used with another embodiment to yield still a different embodiment. Other modifications and variations to the described embodiments are also contemplated within the scope and spirit of the invention.

Figure 1:
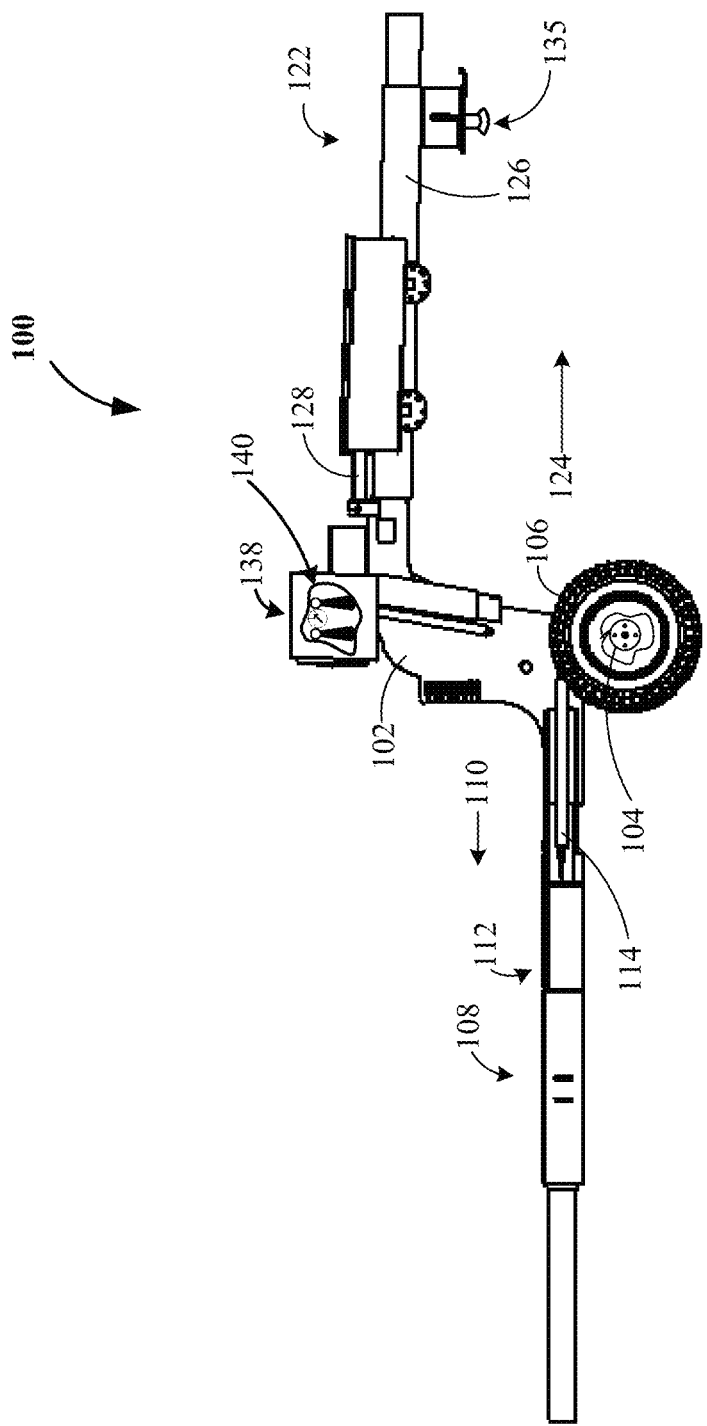
FIG. 1 is a side elevational view of an inventive forward facing vehicle transport ("FFVT") of the present invention.

Referring to the drawings, FIG. 1, presents a side view in elevation of an inventive forward facing vehicle transport ("FFVT") 100. In a preferred embodiment, the FFVT 100, includes a main support member 102, supported by an axle 104, which in turn is supported by a wheel 106. The preferred embodiment further includes a toe tongue 108, secured to the main support member 102, which extends in a first direction 110, from the main support 102. The toe tongue 108, provides a telescopic extension member 112, which is operative by way of an extension mechanism 114. The telescopic extension member 112, is configured to interact with a steer axle 116 (of FIG. 5), of a first vehicle 118 (of FIG. 7). The steer axle 116, is supported by a tire 120 (of FIG. 5), of the first vehicle 118.

Returning to FIG. 1. In the preferred embodiment, the FFVT 100, further includes a pull tongue 122, secured to the main support member 102, and extending in a second direction 124, from then main support member 102. The pull tongue 122 provides a sliding extension member 126, which is operatively coupled with an expansion mechanism 128. The sliding extension member 126 is configured to interact with a fifth wheel 130 (of FIG. 7), of a second vehicle 132

Figure 7:
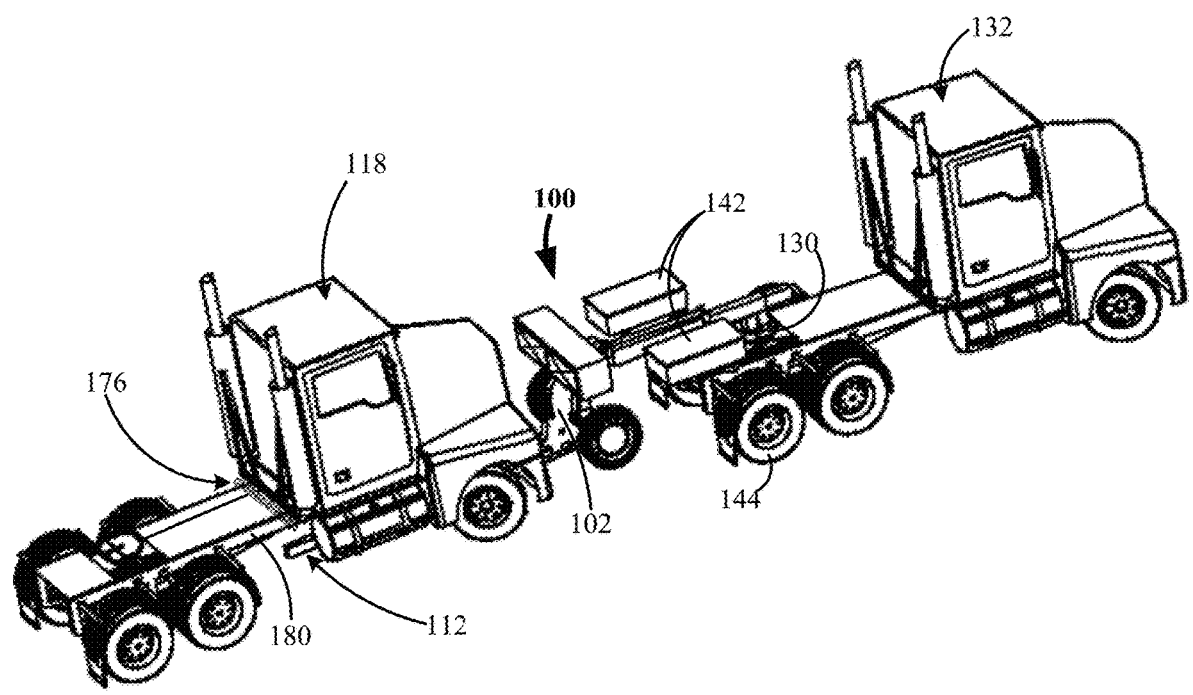
FIG. 7 is a perspective view of a pair of semi-tractors secured to the FFVT, and a transport yoke supported by the rear semi-tractor of the pair of semi-tractors.

(of FIG. 7). The pull tongue 122, provides a king pin 135 (of FIG. 1) that directly engages the fifth wheel 130, of the second vehicle 132.

Figure 2:
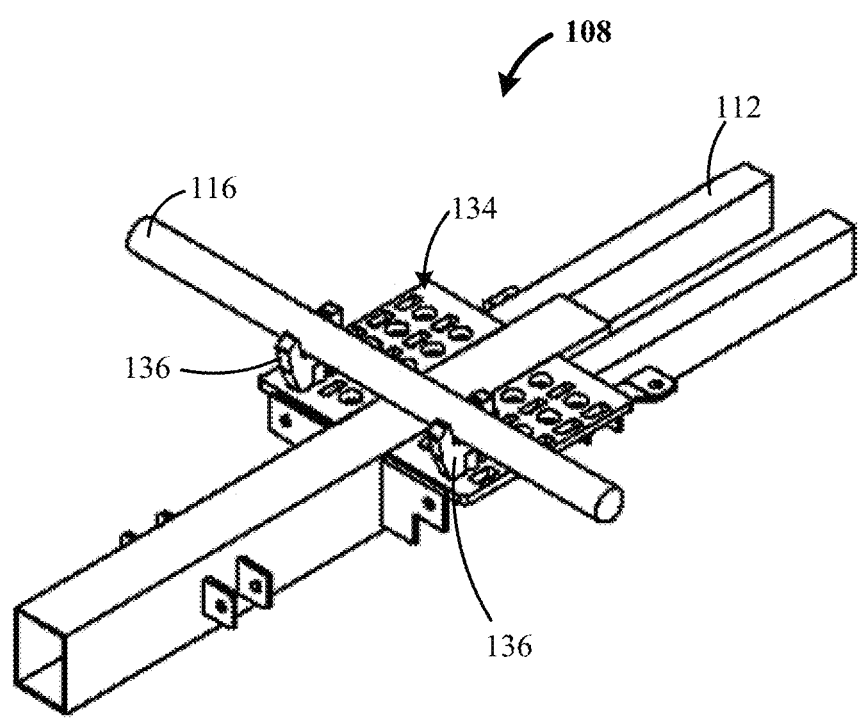
FIG. 2 is a perspective view of the FFVT of FIG. 1.

FIG. 2, shows the toe tongue 108, supports an axle cradle support member 134, which in turn supports an axle cradle 136. The axle cradle support member 134 is secured to the telescopic extension member 112. In the preferred embodiment, the axle cradle 136, is in sliding contact adjacency with and is supporting the steer axle 116, of the first vehicle 118 (of FIG. 5).

Returning to FIG. 1. The FFVT 100, further includes a control box 138, supported by the main support member 102. The control box 138, shelters system controls 140, for use in controlling operation of each the extension mechanism 114, and the expansion mechanism 128.

Figure 3:
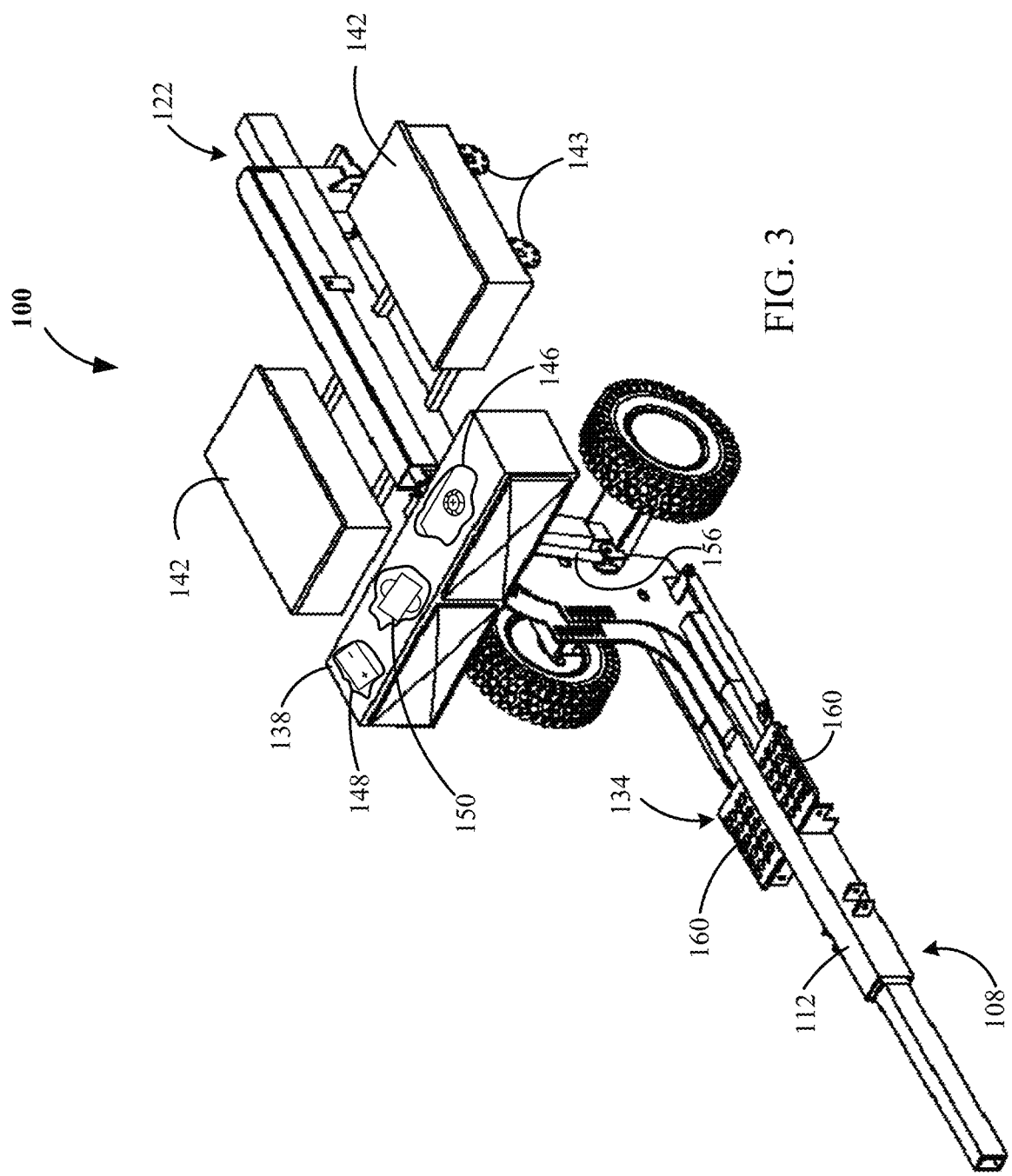
FIG. 3 is a front perspective view of the FFVT of FIG. 1.

FIG. 3, shows the FFVT 100, further includes a combination tool box and debris shield 142, supporting an axle caddy 143, and supported by the pull tongue 122. The combination tool box and debris shield 142, mitigates debris escaping from a tire 144 (of FIG. 7), of the second vehicle 132, impacting the first vehicle 118 (each of FIG. 7). The axle caddy 143, provides storage of drive axles 145 (of FIG. 5), during transport of the first vehicle 118 (of FIG. 5).

FIG. 3, further shows a hydraulic fluid reservoir 146, confined within the control box 138, and a power source 148, disposed within the control box 138. Interposed between hydraulic fluid reservoir 146, and the power source 148, is a hydraulic pump 150. The hydraulic pump 150, is responsive to the system controls 140 (of FIG. 1), during a vehicle load operation of the FFVT 100.

Figure 4:
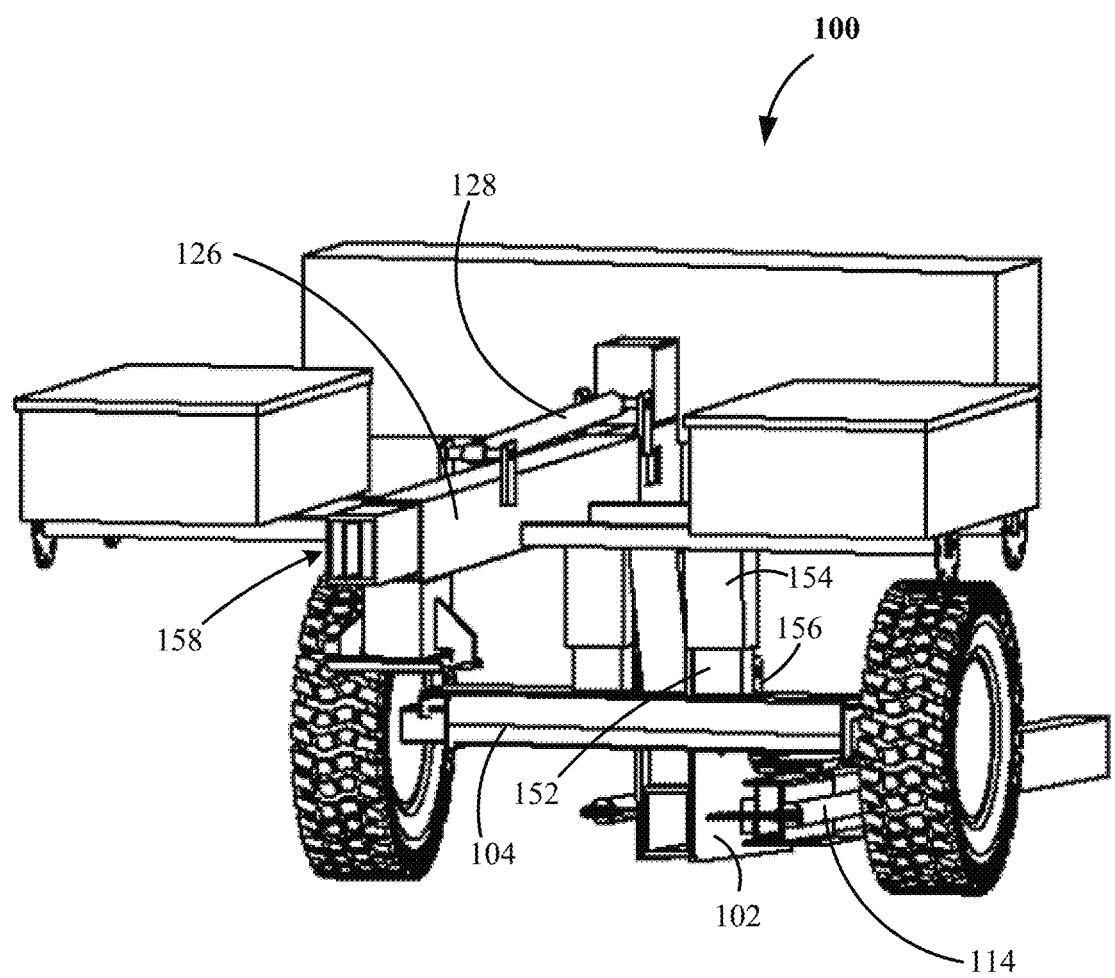
FIG. 4 is a perspective view of the FFVT, illustrating an axle cradle, of FIG. 3, supporting a pair if axle cradles, which are engaging a steer axle of a vehicle.

FIG. 4, reveals in a preferred embodiment, the FFVT 100, further includes a guide post 152, attached to the axle 104, and a vertical slide member 154, attached to the main support member 102. The vertical slide member 154 is in sliding contact with the guide post 152, and responsive to a vertical position control apparatus 156 (also of FIG. 3), interposed between the vertical slide member 154, and the axle 104, the vertical position control apparatus 154, is responsive to the system controls 140, (of FIG. 1). The system controls 140, control the vertical position of the main support member 102, relative to the axle 104. In the preferred embodiment, the system controls 140, are interposed between the hydraulic fluid reservoir 146 (of FIG. 3), and each the extension mechanism 114, the expansion mechanism 128, and the vertical position control apparatus 156. Preferably, each the extension mechanism 114, the expansion mechanism 128, and the vertical position control apparatus 156, are correspondingly a first, second, and third hydraulic cylinders. FIG. 4 further reveals that the sliding extension member 126, houses a plurality of reinforcement members 158. The reinforcement members 158, provide additional support to the steer axle 116 (of FIG. 5), of the first vehicle 118 (Of FIG. 5), when the tire 120 (of FIG. 5) of the first vehicle 118, is elevated above ground level, as shown by FIG. 7.

Returning to FIG. 3. As shown therein, the axle cradle support member 134, provides a plurality of pairs of axle cradle receptacle apertures 160, each axle cradle receptacle aperture of each pair of axle cradle receptacle apertures 160, accommodate the axle cradle 136, (of FIG. 2), the plurality of pairs of axle cradle receptacle apertures 160, accommodate a position of the steer axle 116 (of FIG. 5), of the first vehicle 118 (of FIG. 50), relative to a front bumper 162, of first vehicle 118, for a verity of different makes of the first vehicles 118.

Figure 6:
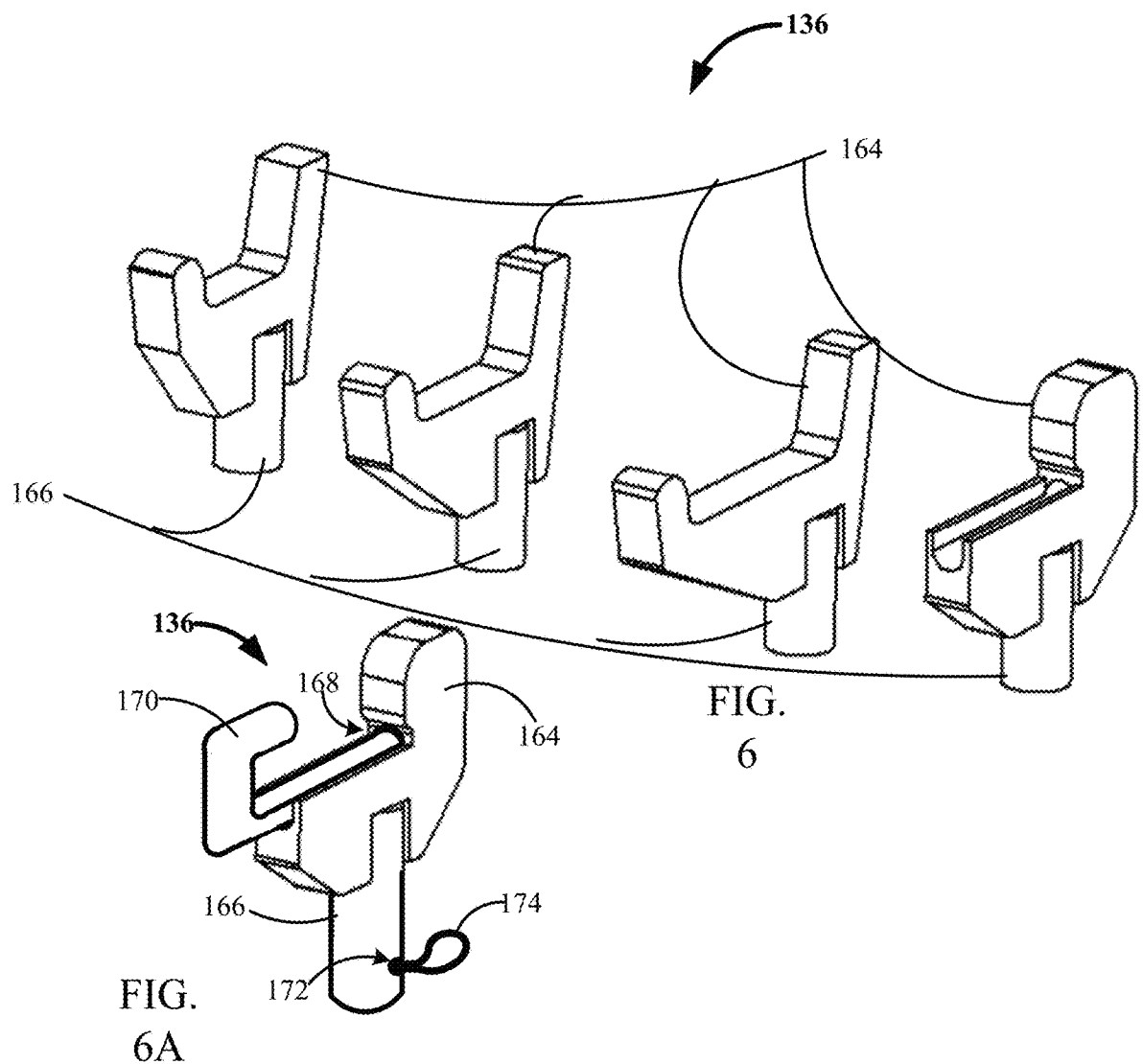
FIG. 6 illustrates a plurality of axle cradles, each of configured for adaption to different brands of semi-tractors.

FIGS. 6 and 6A, depict the axle cradle 136, shows a plurality of embodiments for the axle cradle 136. However, each embodiment presents the same basic structural components that include: a cradle main body 164, the main body adapts to a contour of the steer axles of a plurality of truck brands; an engagement extension 166, protruding from the cradle main body 164, the engagement extension 166, is in sliding communication with a corresponding axle cradle receptacle aperture 160, (of FIG. 3).

Figure 5:
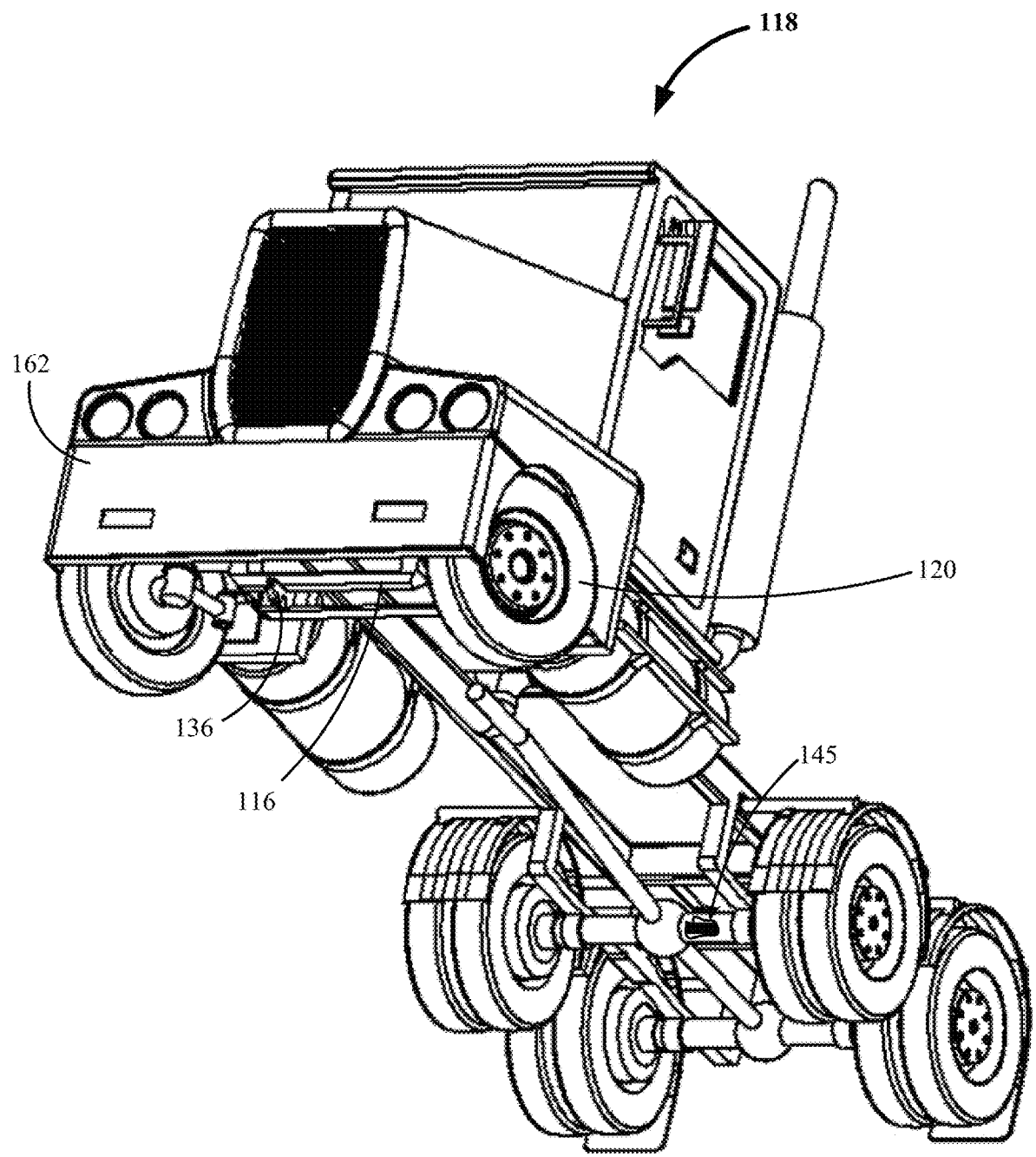
FIG. 5 is a perspective view of a truck illustrating an axle cradle interacting with the steer axle of the truck and a drive axle of the truck.

With regard to FIG. 6A, the embodiment shown therein further includes a fastening mechanism aperture 168, provided by the cradle main body 164, and a fastening mechanism 170, cooperating with the fastening mechanism aperture 168. The fastening mechanism 170, in cooperation with the fastening mechanism aperture 168, secures the axle cradle 136, to the steer axle 116, of the first vehicle 118, as shown by FIG. 5. In a preferred embodiment, the fastening mechanism 170, is in a form of a j-bolt cooperating with an associated j-bolt fastener.

The axle cradle 136, shown by FIG. 6A, further discloses a retention mechanism aperture 172, provided by the engagement extension 166. A retention mechanism 174, in cooperation with the retention mechanism aperture 172, secures the axle cradle 136, to the axle cradle support member 160 (of FIG. 3).

As shown by FIG. 7, FFVT 100, further includes a transport yoke 176, which is supported by a frame 178, of the first vehicle 118. The transport yoke 176, communicates with the telescopic extension member 112, of the pull tongue 108 (of FIG. 3). The transport yoke 176, secures the telescopic extension member 112, of the pull tongue 108, adjacent the frame 178, of the first vehicle 118.

Figure 8:
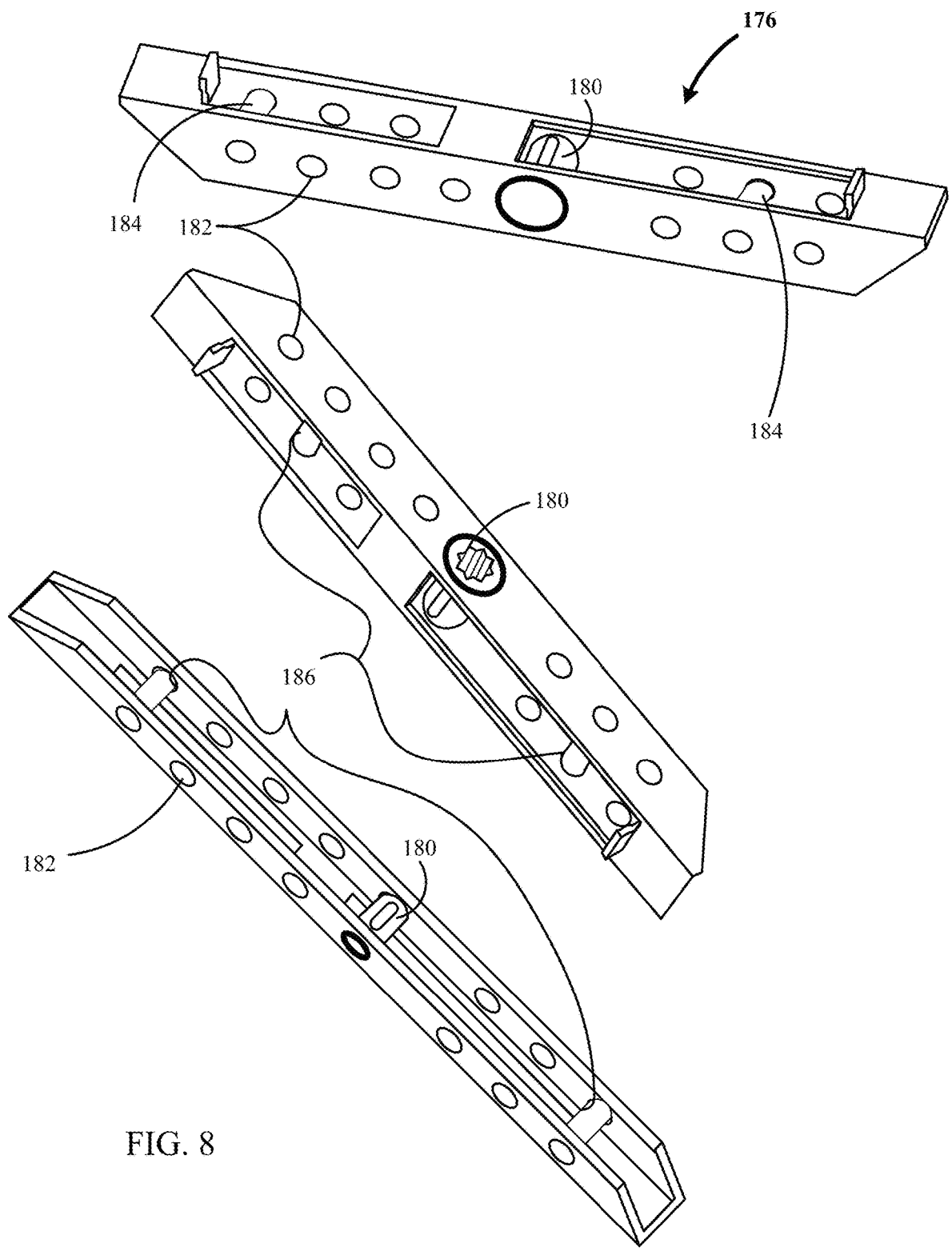
FIG. 8 is shows the transport yoke of FIG. 7, illustrated in a plurality of perspective views.

FIG. 8, shows the transport yoke 176, illustrated in a plurality of perspective views. The transport yoke 176, preferably provides a strap engagement member 180, a plurality of chain retention member apertures 182, and a chain retention member 184. The chain retention member 184, interacting with a selected pair of chain retention member apertures 186, of the plurality of chain retention member apertures 182.

Figure 9:
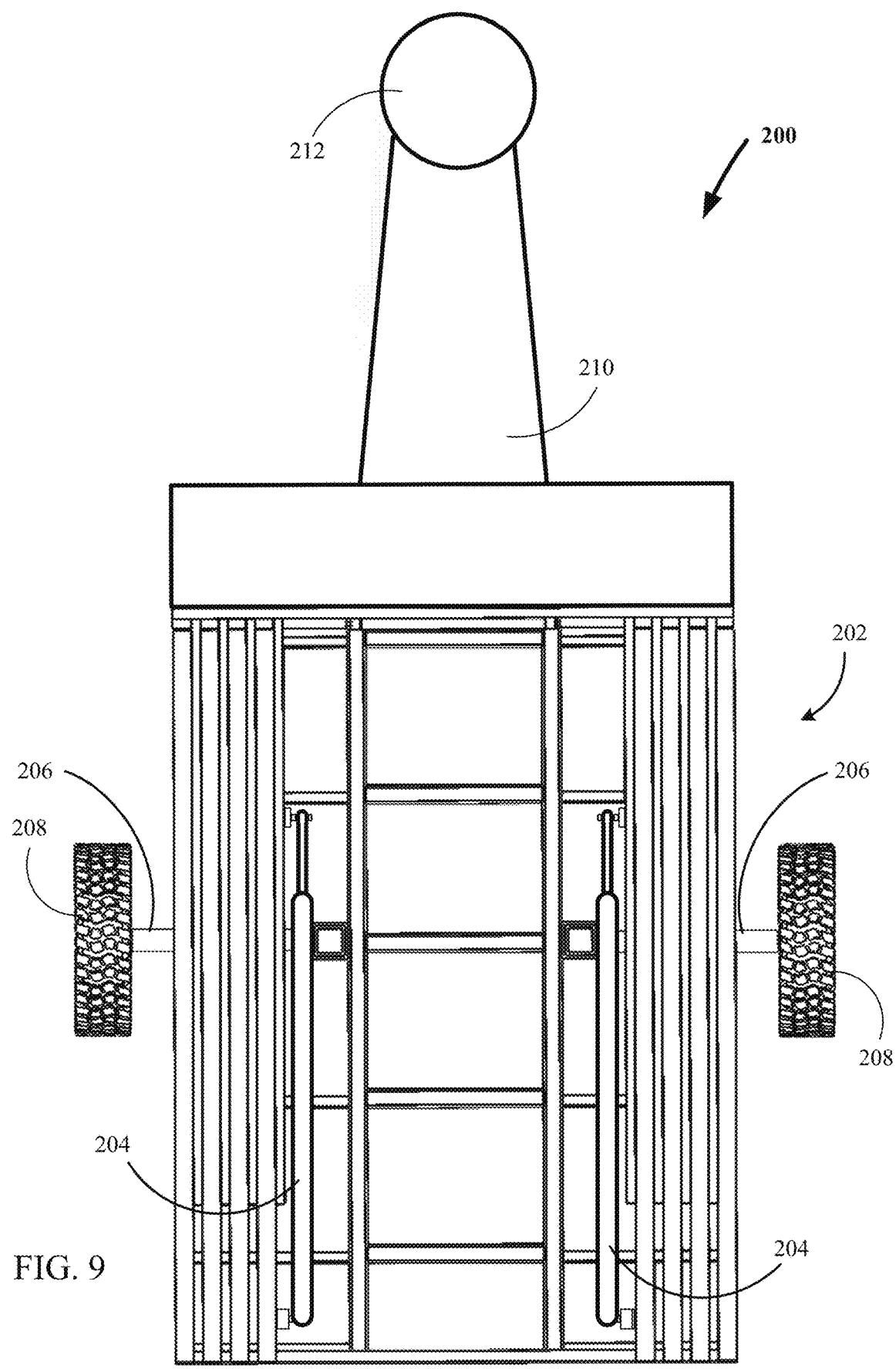
FIG. 9 is a top view of a return transport vehicle ("RTV"), shown in a retracted position, of a forward facing vehicle transport and return vehicle transport combination ("FFVT/RTV"), of FIG. 14.
Figure 14:
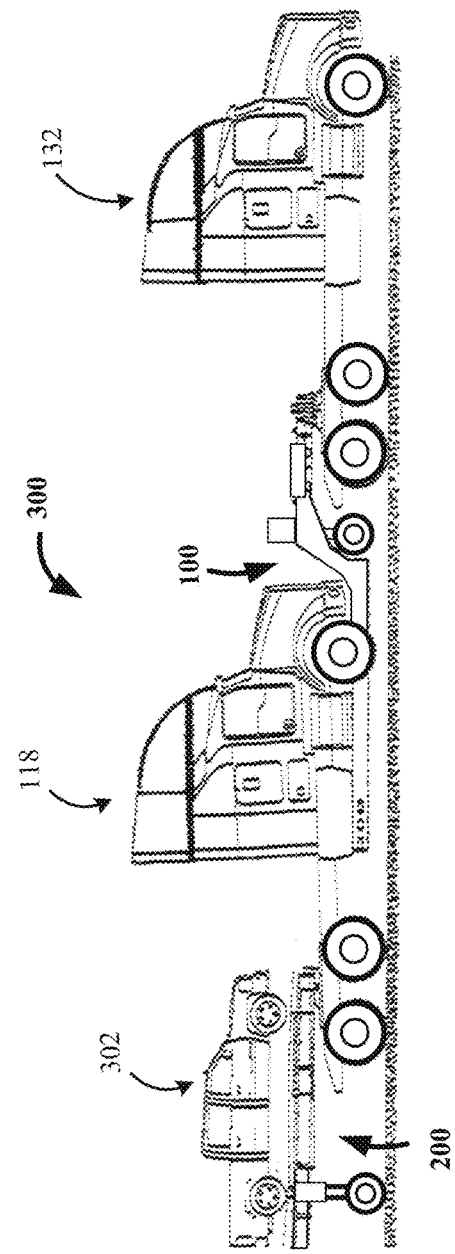
FIG. 14 is a side view in elevation of the FFVT/RTV combination.

FIG. 9, shows a return vehicle transport ("RTV") 200, of a forward facing vehicle transport and return vehicle transport combination ("FFVT/RTV") 300, of FIG. 14. In a preferred embodiment, the RTV 200, provides at least a retracting bed 202. The retracting bed 202, in response to an activation of a return transport vehicle horizontal position control apparatus 204, alters an overall length of the retracting bed 202. The retracting bed 202, is supported by an axle 206, which in turn is supported by a wheel 208.

In the preferred embodiment, shown by FIG. 9, the RTV 200 provides RTV further includes tow tongue 210, secured to the retracting bed 202, to which a king pin support member 212, is secured.

Figure 10:
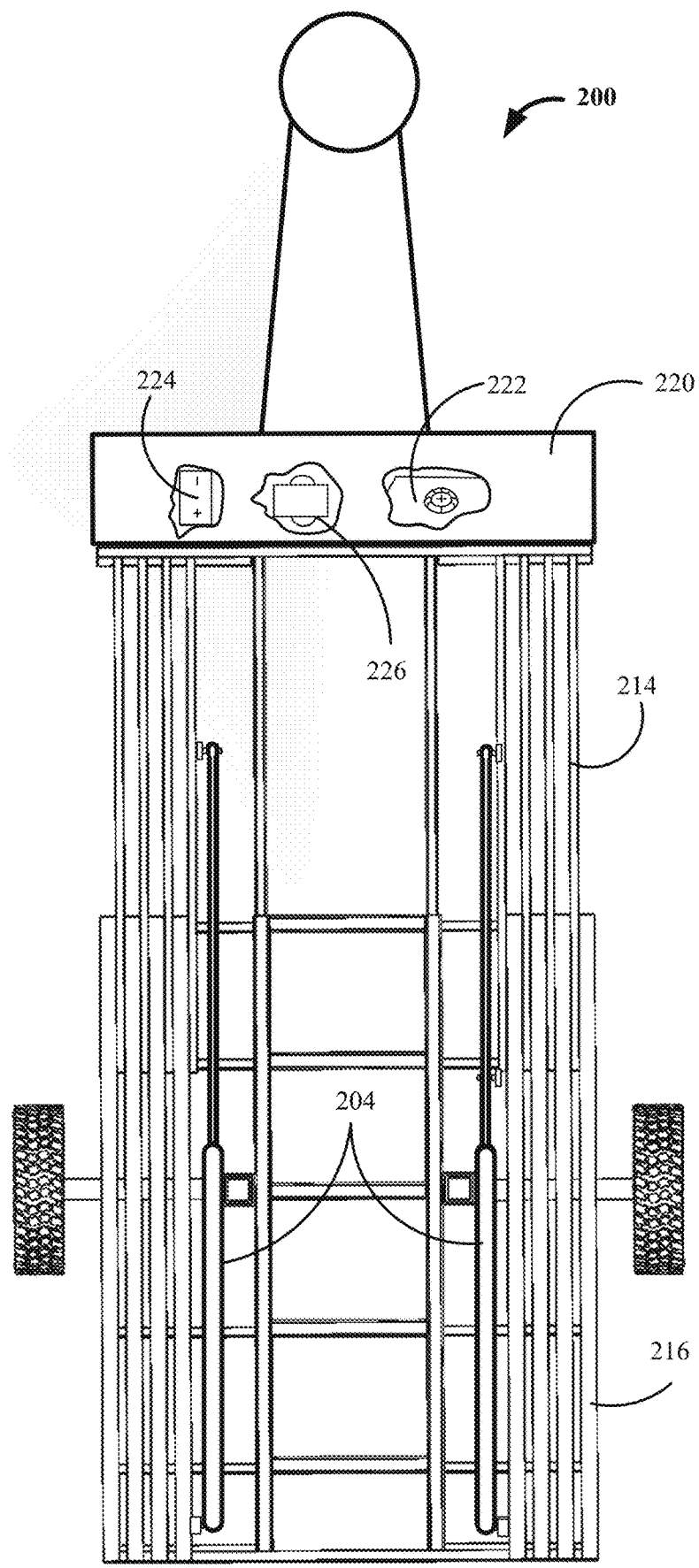
FIG. 10 is a top view of the RTV of FIG. 9, shown in an elongated position.

FIG. 10, shows the RTV 200 in its extended position or form. The RTV 200, preferably includes a front section 214, and a rear section 216. The front section 214 extends in a horizontal direction, relative to the rear section 216, in response to an activation of, the return transport vehicle horizontal position control apparatus 204, which is attached to the rear section 216, communicates with the front section 214, and is responsive to the control system 218 (of FIG. 13), the transport vehicle horizontal position control apparatus 204, sets an overall length of the return transport vehicle 200.

FIG. 10, further show a control container 220. The control container 220, houses a fluid tank 222, which in a preferred embodiment is a hydraulic fluid tank 222. The control container 220, further houses an energy source 224, and a fluid pump 226. The fluid pump 226, is preferably positioned between the energy source 224, and the fluid tank 222. In response to an activation of the control system 218 (of FIG. 13), the fluid pump 226, directs fluid from the fluid tank 222, to the return transport vehicle vertical position control apparatus 204, which extends the front section 214, relative to the rear section 216, else extracts fluid from the return transport vehicle vertical position control apparatus 204, which retracts the front section 214, relative to the rear section 216.

Figure 11:
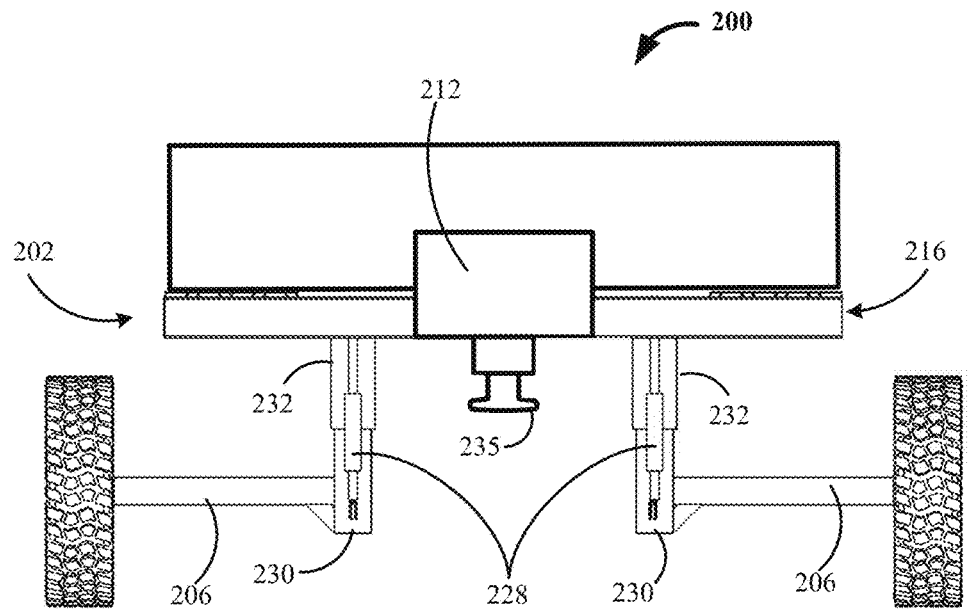
FIG. 11 is a front view in elevation of the RTV of FIG. 9, showing the RTV in a lowered position.

FIG. 11, shows a front view of the RTV 200. The RTV 200, preferably includes a return transport vehicle vertical position control apparatus 228, communicating with a return transport vehicle guide post 230, which in turn is secured to the axle 206. Further show in the preferred of the RTV 200, is a return transport vehicle vertical slide member 232, attached to the rear section 216, of the of the RTV 200. The vertical slide member 232, is in sliding contact with the return transport vehicle guide post 230. The return transport vehicle vertical position control apparatus 228, is responsive to the control system 218 (of FIG. 13). The control system 218, controls a vertical position of the retracting bed 202 (of FIG. 9). The RTV 200, further preferably includes a king pin 235, secured to the king pin support member 212.

Figure 12:
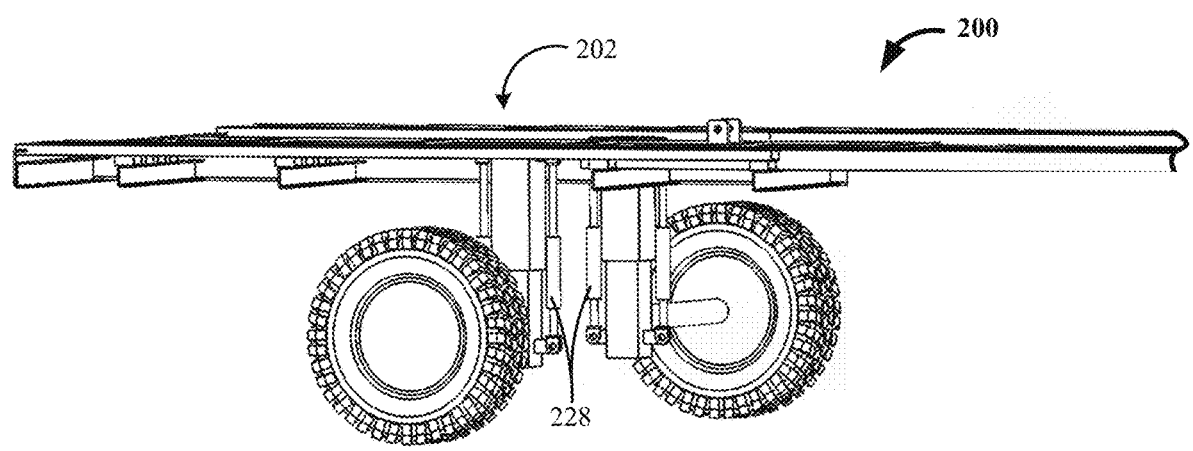
FIG. 12 is a partial cut away, perspective view of the RTV of FIG. 9, shown in the elongated and elevated position.
Figure 13:
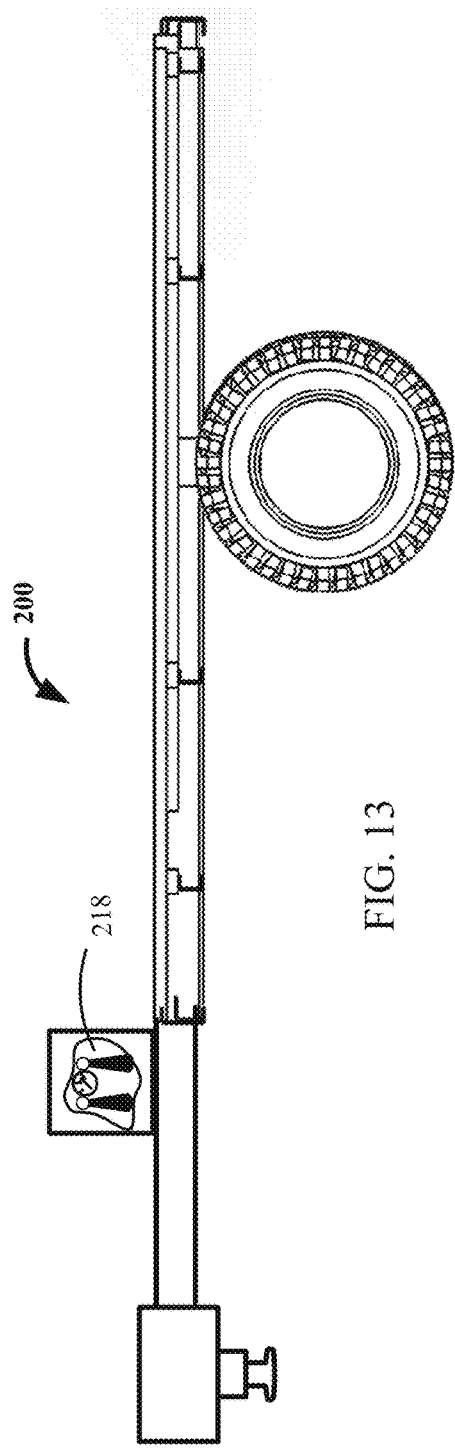
FIG. 13 is a side view in elevation of the RTV of FIG. 1, shown in the retracted and lowered position.

FIG. 12, shows retracting bed 202, of the RTV 200 in a raised position. That is, the return transport vehicle vertical position control apparatus 228, is in its fully extended position, while FIG. 13, shows the control system 218 of the RTV 200.

FIG. 14, shows a forward facing vehicle transport and return transport vehicle combination 300, which preferably includes the RTV 200 supported by the first vehicle 118, and supporting a return vehicle 302. The first vehicle 302, is supported by the FFVT 100, which is attached to the second vehicle 132.

With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Further, it will be clear that the present invention is well adapted to attain the ends and advantages mentioned as well as those inherent therein. While presently exemplary embodiments have been described for purposes of this disclosure, numerous changes may be made which will readily suggest themselves to those skilled in the art and which are encompassed by the appended claims.

What is claimed is:

1. A combination forward facing vehicle transport and return transport vehicle comprising:
   a main support member supported by an axle, the axle supported by a wheel;
   a toe tongue secured to the main support member and extending in a first direction from the main support, the toe tongue provides a telescopic extension member communicating with an extension mechanism, the telescopic extension member configured to interact with a steer axle of a first vehicle, the steer axle supported by a tire of the first vehicle;
   a pull tongue secured to the main support member and extending in a second direction from then main support member, the pull tongue provides a sliding extension member communicating with an expansion mechanism, the sliding extension member configured to interact with a fifth wheel of a second vehicle;
   an axle cradle support member secured to the toe tongue;
   an axle cradle supported by the axle cradle support member, the axle cradle in contact adjacency with and supporting the steer axle of the first vehicle;
   an axle caddy supported by the toe tongue, the axle caddy configured to carry a drive axle of the first vehicle; and
   a control box supported by the main support member, the control box shelters system controls for operation of each the extension mechanism and the expansion mechanism; and
   a return transport vehicle, the return transport vehicle provides at least a retracting bed, the retracting bed, when activated, elongates an overall length of the retracting bed.

2. The combination of claim 1, further comprising:
   a combination tool box and debris shield supported by the pull tongue, the combination tool box and debris shield mitigates debris escaping from a tire of the second vehicle impacting the first vehicle; and
   in which the sliding extension member houses a plurality of reinforcement members, the reinforcement members provide additional support to the steer axle of the first vehicle, when the tire of the first vehicle tire is elevated above ground level.

3. The combination of claim 2, further comprising:
   a guide post attached to the axle;
   a vertical slide member attached to the main support member, the vertical slide member in sliding contact with the guide post; and
   a vertical position control apparatus interposed between the vertical slide member and the axle, the vertical position control apparatus responsive to the system controls, the system controls controlling the vertical position of the main support member relative to the axle.

4. The combination of claim 3, in which the axle cradle support member provides a plurality of pairs of axle cradle receptacle apertures, each axle cradle receptacle aperture of each pair of axle cradle receptacle apertures accommodate the axle cradle, the plurality of pairs of axle cradle receptacle apertures accommodate a position of the steer axle of the first vehicle relative to a front bumper of first vehicle.

5. The combination of claim 4, in which the vertical position control apparatus comprises a first hydraulic cylinder, the extension mechanism comprises a second hydraulic cylinder, and the expansion mechanism comprises a third hydraulic cylinder.

6. The combination of claim 5, further comprising:
   a hydraulic fluid reservoir confined within the control box; and
   the system controls interposed between the hydraulic fluid reservoir and each the first, second, and third hydraulic cylinders.

7. The combination of claim 6, further comprising:
   a power source disposed within the control box; and
   a hydraulic pump interposed between each the power source and the hydraulic fluid reservoir.

8. The combination of claim 7, further comprising a transport yoke supported by a frame of the first vehicle, the transport yoke communicates with the telescopic extension member of the toe tongue, the transport yoke secures the telescopic extension member of the toe tongue adjacent the frame of the first vehicle.

9. The combination of claim 8, in which transport yoke comprises:
   a strap engagement member;
   a plurality of chain retention member apertures, and a chain retention member interacting with a selected pair of chain retention member apertures of the plurality of chain retention member apertures.

10. The combination of claim 9, in which the axle cradle comprises:
    a cradle main body, the cradle main body adapts to a contour of the steer axle of the first truck; and
    an engagement extension protruding from the cradle main body, the engagement extension is in sliding communication with a corresponding axle cradle receptacle aperture.

11. The combination of claim 10, in which the axle cradle further comprising:
    a fastening mechanism aperture provided by the cradle main body; and
    a fastening mechanism cooperating with the fastening mechanism aperture, the fastening mechanism in cooperation with the fastening mechanism aperture secures the axle cradle to the steer axle of the first vehicle.

12. The combination of claim 11, in which the fastening mechanism is in a form of a j-bolt cooperating with an associated j-bolt fastener.

13. The combination of claim 12, in which the axle cradle further comprising;
    a retention mechanism aperture; and
    a retention mechanism, the retention mechanism in cooperation with the retention mechanism aperture secures the axle cradle to the axle cradle support member.

14. The combination of claim 13, in which the first vehicle is a first truck.

15. The combination of claim 14, in which the first truck is a first semi-tractor.

16. The combination of claim 15, in which the second vehicle is a second truck.

17. The combination of claim 16, in which the second truck is a second semi-tractor.

18. The combination of claim 17, further comprising:
    an energy source disposed within the control container; and
    a fluid pump interposed between each the energy source and the fluid tank.

19. The combination of claim 16, further comprising:
    a control container;
    a fluid tank confined within the control container; and
    the control system communicating with each the fluid tank and the return transport vehicle vertical position control apparatus.

20. The combination of claim 1, in which the retracting bed includes at least a front section and a rear section, upon activation, the front section slides relative to the rear section, which provides an increased overall length of the retracting bed, the return transport vehicle further comprising:
    a return transport vehicle axle, the return transport axle supports the retracting bed;
    a wheel supporting the return transport vehicle axle;
    a return transport vehicle guide post secured to the axle;
    a return transport vehicle vertical slide member attached to the rear section of the return transport vehicle, the vertical slide member in sliding contact with the return transport vehicle guide post; and
    a return transport vehicle vertical position control apparatus interposed between the return transport vehicle vertical slide member and the axle, the return transport vehicle vertical position control apparatus responsive to a control system, the control system controls a vertical position of the retracting bed.

21. The combination of claim 20, in which the front section provide a return transport vehicle king pin, and further comprising, a return transport vehicle horizontal position control apparatus attached to the rear section, communicates with the front section, and is responsive to the control system, the transport vehicle horizontal position control apparatus sets an overall length of the return transport vehicle.

* * * * *